(12) United States Patent
Brezinski

(10) Patent No.: US 6,415,865 B1
(45) Date of Patent: Jul. 9, 2002

(54) ELECTRON TRANSFER AGENTS IN WELL ACIDIZING COMPOSITIONS AND METHODS

(76) Inventor: Michael M. Brezinski, 2305 W. Club Rd., Duncan, OK (US) 73533

(*) Notice: Subject to any disclaimer, the term of this patent is extended or adjusted under 35 U.S.C. 154(b) by 0 days.

(21) Appl. No.: 09/801,528

(22) Filed: Mar. 8, 2001

(51) Int. Cl.$^7$ .................. E21B 37/06; E21B 43/22; E21B 43/27
(52) U.S. Cl. ............ 166/279; 166/300; 166/304; 166/307; 166/312; 210/757; 507/258; 507/269; 507/274; 507/277; 507/933
(58) Field of Search .................. 166/279, 300, 166/304, 307, 312; 210/757; 507/90, 258, 259, 260, 261, 267, 269, 274, 277, 933

(56) References Cited

U.S. PATENT DOCUMENTS

| | | |
|---|---|---|
| 2,963,439 A | 12/1960 | Eberhard |
| 3,142,335 A | 7/1964 | Dill et al. |
| 3,669,613 A | 6/1972 | Knox et al. |
| 3,696,040 A | 10/1972 | Mayo |
| 3,773,465 A | 11/1973 | Keeney et al. |
| 4,091,073 A | 5/1978 | Winkler |
| 4,096,914 A | 6/1978 | McLaughlin et al. |
| 4,137,972 A | 2/1979 | McLaughlin et al. |
| 4,143,052 A | 3/1979 | Barrault et al. |
| 4,167,214 A | 9/1979 | Street, Jr. |
| 4,169,797 A | 10/1979 | Johnston, Jr. et al. |
| 4,317,735 A | 3/1982 | Crowe |
| 4,356,155 A | 10/1982 | Blytas et al. |
| 4,420,565 A | 12/1983 | Schmitt |
| 4,537,684 A | 8/1985 | Gallup et al. |
| 4,574,050 A | 3/1986 | Crowe et al. |
| 4,633,949 A | 1/1987 | Crowe |
| 4,646,835 A | 3/1987 | Watkins |
| 4,661,266 A | 4/1987 | Kanda et al. |
| 4,675,120 A | 6/1987 | Martucci |
| 4,676,916 A | 6/1987 | Crema |
| 4,709,767 A | 12/1987 | Alexander |
| 4,762,626 A | 8/1988 | Emmons et al. |
| 4,781,901 A | 11/1988 | Jeffrey |
| 4,784,778 A | 11/1988 | Shin |
| 4,784,779 A | 11/1988 | Dadgar |
| 4,815,537 A | 3/1989 | Jones |
| 4,830,766 A | 5/1989 | Gallup et al. |
| 4,836,286 A | 6/1989 | Edwards |
| 4,871,024 A | 10/1989 | Cizek |
| 4,888,121 A | 12/1989 | Dill et al. |
| 4,949,790 A | 8/1990 | Dill et al. |
| 5,013,483 A | 5/1991 | Frenier et al. |
| 5,017,281 A | 5/1991 | Sadeghi et al. |
| 5,058,678 A | 10/1991 | Dill et al. |
| 5,063,997 A | 11/1991 | Pachla et al. |
| 5,073,270 A | 12/1991 | Gallup et al. |
| 5,264,141 A | 11/1993 | Brezinski et al. |
| 5,445,221 A | 8/1995 | Vinson |
| 5,622,919 A * | 4/1997 | Brezinski et al. .............. 134/39 |
| 6,060,435 A * | 5/2000 | Beard et al. ................. 166/279 |
| 6,225,261 B1 * | 5/2001 | Brezinski et al. ........... 166/308 |
| 6,306,799 B1 * | 10/2001 | Feraud et al. ................ 166/308 |
| 6,308,778 B1 * | 10/2001 | Girgis-Ghaly et al. ....... 166/300 |

FOREIGN PATENT DOCUMENTS

| | | |
|---|---|---|
| CA | 873792 | 6/1971 |
| CA | 1197673 | 12/1985 |
| CA | 1275794 | 11/1990 |
| CA | 1278178 | 12/1990 |
| CA | 1281178 | 3/1991 |
| FR | 91 06774 | 12/1992 |
| WO | WO 93/0633 | 4/1993 |

OTHER PUBLICATIONS

Petroleum Society of CIM, Michael S. Walker et al., "Iron Control in Sour Gas Wells Provides Sustained Production Increase," May 1989, Banff, Canada.

Society of Petroleum Engineers, M.L. Walker et al., Iron Control in West Texas Sour Gas Wells Provides Sustained Production Increase, pp. 303–308, 1990, Richardson, Texas.

* cited by examiner

*Primary Examiner*—George Suchfield
(74) *Attorney, Agent, or Firm*—Robert A. Kent; Clifford C. Dougherty, III

(57) ABSTRACT

An acidizing composition and a method of acidizing a hydrocarbon bearing subterranean formation in the presence of ferric ions are provided. The acidizing composition includes a strong mineral acid solution, an electron donor agent, a primary electron transfer agent and a secondary electron transfer agent. The primary electron transfer agent is a source of rhenium ions. The secondary electron transfer agent is a source of iodide ion or iodine. The electron donor agent and primary and secondary electron transfer agents function together to reduce ferric ion present in the mineral acid solution to ferrous ion which in turn prevents ferric hydroxide and/or free sulfur from precipitating out of the solution and reduces the formation of sludge in crude oil in the formation. The particular electron transfer agents used in connection with the invention function with virtually all known electron donor agents.

16 Claims, No Drawings

ELECTRON TRANSFER AGENTS IN WELL ACIDIZING COMPOSITIONS AND METHODS

BACKGROUND OF THE INVENTION

1. Field of the Invention

In one aspect, the invention relates to the treatment of a hydrocarbon-bearing subterranean formation with an acidic composition to facilitate the recovery of hydrocarbons from the formation. In this aspect, the invention more specifically relates to the acid treatment of such a formation in the presence of ferric ions. It still further relates to the treatment of a hydrocarbon-bearing subterranean formation with a strong mineral acid composition formulated to prevent the precipitation of ferric hydroxide and/or free sulfur in the formation and to resist the formation of sludge in crude oil in the formation.

In another aspect, the invention relates to the treatment of metal surfaces (for example, the internal metal surfaces of industrial equipment) with an acid solution to remove scale and other deposits therefrom. In this aspect, the invention more specifically relates to the acid treatment of such surfaces with a strong mineral acid composition formulated to prevent the precipitation of ferric hydroxide and/or free sulfur during the treatment.

2. Description of the Prior Art

Formation acidizing or "acidizing" is a well-known method for increasing the flow of fluid from a subterranean formation. The formation is contacted with an acidic composition to react with and dissolve materials contained therein for the purpose of increasing the conductivity of the formation. The flow of fluid from the formation is therefore increased because of the increase in formation conductivity caused by the dissolution of the material.

A common method of acidizing a subterranean formation comprises the steps of conducting an acid composition to the formation through tubing disposed in a borehole penetrating the formation, forcing the acid composition into contact with the formation and permitting the acid to react with and dissolve certain materials contained in the formation to thereby enlarge pore spaces within the formation and thus increase the permeability of the formation. The acidizing of calcareous formations, such as limestone formations, has been successfully conducted utilizing hydrochloric acid, certain organic acids such as acetic acid, citric acid and formic acid and mixtures thereof.

The object of formation acidizing—increasing formation conductivity—can be frustrated if precipitates are produced in the acid solution. The precipitates can fill and plug pore spaces in the formation with the consequent result of failing to increase and possibly even decreasing formation conductivity. Problematic precipitates include compounds containing iron, nonferrous metals, free sulfur and metal sulfides.

It is well known that in acidizing a subterranean formation contamination of the acid solution with dissolved iron is inevitable. For example, many acid solutions (e.g., hydrochloric acid solutions) dissolve rust, mill scale and other iron-containing scale from metal conduits (such as the tubing disposed in the borehole) and equipment associated with the well, and also dissolve iron-containing minerals (such as magnetite ($Fe_3O_4$)) present in the formation. As the acid reacts and spends, the pH of the solution increases. Once the pH of the solution reaches a level of about 2.5, dissolved iron present in the solution in the ferric, Fe(III), oxidation state begins to precipitate in the form of ferric hydroxides (e.g., $Fe(OH)_3$, Fe(O)(OH), etc.). The ferric hydroxide precipitate can plug the formation and thus cause serious well damage. Ferrous hydroxide is much more soluble and typically not as much of a problem.

Wells containing quantities of sulfide and particularly hydrogen sulfide are sometimes referred to as "sour wells." In these wells, regardless of what they are called, the combination of sulfide ions and iron creates precipitation problems. Sulfide ions reduce ferric ions to ferrous ions by the following reaction:

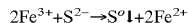

The resulting elemental or free sulfur can precipitate, plug the formation and thus cause serious well damage.

Unfortunately, attempts to control precipitation problems by maintaining the pH of the acid solution below a certain level, for example below 2.5, have failed. It simply is not feasible in most acid treatment operations to prevent the pH of the acid solution from increasing to a level of 2.5 or higher at some point in the operation. For example, when an acid such as hydrochloric acid is used to acidize a calcareous (e.g., limestone) formation, the acid typically spends to an extent such that the pH of the acid solution increases to a value of 4 or higher.

Another problem is the formation of sludge in crude oil in the formation. For example, strong hydrochloric acid solutions (e.g., $\geq 15\%$ by weight) can cause the development of sludge when the acid contacts crude oil. The presence of ferric ions in the crude or acid solution makes controlling the sludge difficult or even impossible. The quality and quantity of precipitated sludge is also related to formation temperature, acid concentration, and the concentration of asphaltenes and maltenes in the crude oil.

The presence of acid soluble ferric ion in an acidizing composition can cause other problems as well. For example, the ferric ion can lead to increased corrosion, additive separation and emulsion formation.

Numerous acidizing compositions and methods for controlling precipitation and sludge during acidizing treatments have been developed heretofore. The effectiveness of such compositions and methods varies depending upon the type of acid used, formation characteristics and conditions and other factors known to those skilled in the art.

Precipitation out of the acid solution is particularly a problem when the acid solution includes one or more mineral acids. For example, organic acids alone do not dissolve a significant amount of iron scale until the associated temperature reaches around 400° F., which often does not occur. Furthermore, ferric ion is more difficult to reduce in mineral acid systems than in organic acid systems. As discussed below, in mineral acid systems, reducing agents alone typically do not sufficiently reduce ferric ion. Many iron reducing agents are not effective at high acidity levels (e.g.,>5% hydrochloric acid), levels at which many of the above problems are caused or exasperated.

There is a continuing need for improved compositions and methods for controlling precipitation and sludge during acidizing operations, particularly when mineral acid systems are utilized. There is also a continuing need for improved mineral acid solutions for acidizing metal surfaces such as the internal surfaces of industrial equipment without generating damaging precipitate.

SUMMARY OF THE INVENTION

The present invention provides a strong mineral acid composition that is very effective for treating wells and carrying out other operations while at the same time controlling damaging precipitation problems. The invention also provides a method of treating a subterranean formation with a strong mineral acid solution in the presence of ferric ions. The inventive system effectively reduces ferric ion in live acid treatment fluids, eliminating the adverse effects of ferric ion described above. Precipitation of insoluble compounds such as ferric hydroxide and free sulfur from the acid solution and formation of sludge in association with crude oil is prevented.

In one aspect, the invention is an acidizing composition comprising a strong mineral acid solution, an electron donor agent, a primary electron transfer agent and a secondary electron transfer agent. As discussed below, each component plays a critical role in the performance of the composition.

The strong mineral acid solution comprises, for example, an aqueous solution including at least about 25% by weight, based on the total weight of the solution, hydrochloric acid.

The electron donor agent is preferably selected from the group consisting of (1) a thiol (mercaptan) compound having a carbon chain that includes an oxygen or oxygen containing functional group (e.g., HO—, RO—) (preferably in the beta position), (2) hypophosphorous acid ($H_3PO_2$), and (3) a hypophosphorous acid precursor (e.g., a salt of hypophosphorous acid).

The thiol (mercaptan) compound suitable for use as the electron donor agent is preferably selected from the group consisting of compounds of the formula $HSCH_2C(O)R_1$ and compounds of the formula $HSCH_2C(OH)R_3R_4$ wherein:

$R_1$ is either OH OM or $R_2$;

M is a corresponding cation of the alkoxide or a carboxylate anion of the thiol;

$R_2$ is an organic radical having from 1 to 6 carbon atoms;

$R_3$ is either H or an organic radical having from 1 to 6 carbon atoms; and $R_4$ is either H or an organic radical having from 1 to 6 carbon atoms.

For example, $R_3$ can be H and $R_4$ can be $C_2H_5$; o[00f8] $R_3$ can be $C_2H_5$ and $R_4$ can be H; or $R_3$ and $R_4$ can both be H; or $R_3$ and $R_4$ can both be $C_2H_5$.

The primary electron transfer agent is a source of rhenium ions, that is a compound or complex which generates or releases rhenium ions in the acid solution. An example of a source of rhenium ions is perrhenic acid ($HReO_4$).

The secondary electron transfer agent is a source of iodide ion or iodine, i.e., a compound or complex that generates or releases iodide ion or iodine in the acid solution. For example, sodium iodide, potassium iodide and/or iodine can be used.

In another aspect, the invention provides a method of treating a subterranean formation utilizing the inventive acidizing composition.

The invention is particularly applicable for treating hydrocarbon-bearing, subterranean calcareous formations. The inventive composition dissolves portions of the formation to thereby increase the conductivity of the formation but does not produce, foster, or otherwise generate an environment conducive to the formation of insoluble precipitate or sludge. More specifically, when used to treat a formation in the presence of ferric ions, ferrous ions and/or sulfides, the inventive composition prevents or at least reduces the precipitation of ferric hydroxide and/or free sulfur. In a preferred embodiment, all components of the inventive acidizing system and resulting end products are water-soluble. The system is more environmentally compatible than similar systems used heretofore. The electron donor agent and primary and secondary electron transfer agents act together to very rapidly reduce ferric ion to ferrous ion in the presence of the mineral acid solution before the ferric ion can be reduced by any competing sulfide and before the ferric ion precipitates as insoluble ferric hydroxide. Due to the fact that a mineral acid system is used, the electron transfer agents are necessary for the desired reduction to occur.

The particular electron transfer agents used in connection with the inventive acidizing composition are very advantageous for several reasons. For example, the electron transfer agents effectively function with essentially all known electron donor agents including thiol compounds (mercaptans) (e.g., thioglycolic acid and thioglycolic acid derivatives), hypophosphorous acid and hypophosphorous acid precursors (e.g., hypophosphorous acid salts).

Surprisingly, the primary electron transfer agent is very effective in very small quantities. This makes the overall composition more economical and potentially more environmentally friendly. The electron transfer agents and resulting electron transfer system are, in effect, the heart of the invention.

When the formation being treated contains a crude that exhibits ferric ion induced sludging characteristics, the inventive acidizing composition effectively reduces or eliminates the sludge.

The inventive composition is not limited to treating wells. For example, the composition is effective for use as a cleaning solution for industrial equipment. For example, when circulated through pumps, heat exchangers and similar equipment, the inventive composition effectively removes iron and other types of scale without allowing damaging precipitation of ferric compounds to occur.

It is, therefore, a primary object of the present invention to provide an improved mineral acid acidizing composition and an improved method of treating a subterranean formation in the presence of ferric ions and/or sulfide ions. Numerous other objects, features and advantages of the invention will be apparent to those skilled in the art upon reading the following description of preferred embodiments and accompanying examples.

DESCRIPTION OF THE PREFERRED EMBODIMENTS

In accordance with the present invention, an acidizing composition and a method of treating a subterranean formation are provided.

As used herein the term "well" refers to a bore, shaft, hole or wellbore penetrating a subterranean formation and all piping and equipment associated therewith. The term "well" includes both injection and production wells. The expression "sour well" refers to an oil and gas well that contains sulfides. The term "sulfides" includes free sulfide ions, sulfides combined with hydrogen in the form of hydrogen sulfide and sulfides combined with other elements, such as metals, in the form of other compounds. Examples of metal sulfides include ferrous sulfide, zinc sulfide and lead sulfide.

For purposes of this invention, sludge is defined as a solid material formed in crude oil which may, under certain conditions, precipitate from the crude oil. Formation of sludge in crude oil while the crude oil is in the formation can make it very difficult if not impossible to recover the oil from the formation. For purposes of this invention, crude oil subject to the formation of sludge is referred to as sludging crude.

The inventive acidizing composition comprises a strong mineral acid solution, an electron donor agent, a primary electron transfer agent and a secondary electron transfer agent.

As used herein and in the appended claims, a strong mineral acid solution means:

(a) an aqueous acid solution including at least about 25% by weight, based on the total weight of the solution, hydrochloric acid; or (b) an aqueous acid solution including a mixture of hydrochloric acid and one or more other acids, said hydrochloric acid and other acids being present in the solution in amounts sufficient for the solution to have an acid strength equal to or greater than the acid strength of an aqueous acid solution including about 25% by weight, based on the total weight of the solution, hydrochloric acid.

A strong mineral acid solution, as defined above, is needed to cause iodide oxidation in the system. Examples of acids that can be combined with hydrochloric acid when a mixture of hydrochloric acid and one or more other acids is employed include organic acids such as acetic acid, propionic acid, lactic acid, glycolic acid, citric acid and formic acid.

The particular acid formulation as well as the exact concentration of acid(s) employed will vary depending on the type of acid(s) involved, the particular application (including formation characteristics and conditions) and other factors known to those skilled in the art. The aqueous acid solution preferably contains in the range of from about 25% to about 35% by weight hydrochloric acid, most preferably 28% by weight hydrochloric acid, based on the total weight of the solution (prior to admixing the other components of the inventive acidizing composition therewith). Most preferably, for cost and convenience reasons, the only acid used in forming the strong mineral acid solution is hydrochloric acid.

An advantage of the invention is that due to the particular electron transfer agents utilized, essentially all known electron donor agents can be used. As used herein and in the appended claims, the term electron donor agent means a compound capable of donating one or more electrons to the electron transfer agents. The electron donor agent employed in the inventive acidizing composition is preferably soluble in the acid solution and selected from the group consisting of (1) a thiol (mercaptan) compound having a carbon chain that includes an oxygen or oxygen containing functional group (e.g., HO—, RO—) in the beta position, (2) hypophosphorous acid ($H_3PO_2$), and (3) one or more hypophosphorous acid precursors. It very effectively reduces ferric ion to the innocuous ferrous state in live acid. It is soluble and stable in all concentrations.

The thiol (mercaptan) compound useful as the electron donor agent of the inventive composition is preferably selected from the group consisting of compounds of the formula $HSCH_2C(O)R_1$ and compounds of the formula $HSCH_2C(OH)R_3R_4$ wherein:

$R_1$ is either OH, OM or $R_2$;

M is a corresponding cation of the alkoxide or carboxylate anion of the thiol;

$R_2$ is an organic radical having from 1 to 6 carbon atoms;

$R_3$ is either H or an organic radical having from 1 to 6 carbon atoms; and $R_4$ is either H or an organic radical having from 1 to 6 carbon atoms.

M is preferably selected from the group consisting of sodium, potassium and ammonium ($NH_4$).

More preferably, the thiol (mercaptan) compound useful as the electron donor agent of the inventive composition is selected from the group consisting of thioglycolic acid, thioglycolic acid precursors, β-hydroxymercaptans, thiomalic acid and thiolactic acid. Suitable compounds include but are not limited to: thioglycolic acid, α-methylthioglycolic acid, methyl-thioglycolate, a-phenylthioglycolic acid, methyl-α-methylthioglycolate, benzylthioglycolate, α-benzylthioglycolic acid, ammonium thioglycolate, calcium dithioglycolate, β-thiopropionic acid, methyl-β-thiopropionate, sodium-β-thiopropionate, 3-mercapto-1,2-propanediol, thiomalic (mercaptosuccinic) acid, thiolactic acid and mercaptoethanol. Thioglycolic acid is very suitable.

In another embodiment, the electron donor agent of the inventive acidizing composition is hypophosphorous acid (also called phosphinic acid) ($H_3PO_2$) and/or one or more hypophosphorous acid precursors (i.e., a compound capable of producing hypophosphorous acid in aqueous acidic media). An example of a hypophosphorous acid precursor is a hypophosphorous acid salt. Hypophosphorous acid salts ionize in the aqueous acid solution and are protonated thus forming hypophosphorous acid. Suitable hypophosphorous salts include sodium phosphinate, calcium phosphinate, ammonium phosphinate and potassium phosphinate. Sodium phosphinate should not be used in 28% by weight hydrochloric acid due to possible precipitation of sodium chloride.

Using hypophosphorous acid and/or one or more salts thereof as the electron donor agent is advantageous in that hypophosphorous acid and its salts are not as corrosive as other reducing agents and are better suited for high temperature applications.

The electron donor agent of the inventive acidizing composition preferably operates in conjunction with the electron transfer agents to result in the reduction of all of the ferric ion in the acid solution to ferrous ion. The amount of the electron donor agent required to do this is dependent upon the molecular weight of the particular electron donor agent employed. The electron production resulting from use of the electron donor agent is quantitative; all of the electron donor agent is consumed (oxidized). Thus, the reaction is stoichiometric. This means that the quantity of the electron donor agent required will be a function of its molecular weight as well as how much ferric iron (Fe(III)) needs to be reduced. One liter of fluid containing 5,000 ppm Fe(III) contains 0.089 moles Fe(III). Thus, for example:

Thioglycolic acid: 0.089 moles×92.12 g/mole=8.25 g/liter;

Ammonium thioglycolate: 0.089 moles×109.15 g/mole= 9.75 g/liter;

1-mercaptoethanol: 0.089 moles×78.14 g/mole=7.0 g/liter.

Accordingly, there is no limit, at least from a chemical standpoint, on how much Fe(III) can be reduced in accordance with the invention (economics will dictate the limit).

From a practical standpoint, the amount of the electron donor agent used is in the range of from about 0.01% to about 10%/o by volume based on the volume of the mineral acid acid solution. An amount in this range is adequate for most applications (0.1% of the electron donor agent for every 500 ppm of ferric ion protection desired is a good rule of thumb). A more typical range for the amount of the electron donor agent employed in the inventive composition is from about 0.1% to about 6% by volume based on the volume of the mineral acid solution.

The electron transfer agents of the inventive acidizing composition allow the desired ferric ion reduction to be achieved in strong mineral acid solutions. The electron transfer agents also allow the desired reduction to be achieved regardless of the specific electron donor agent used. For example, the primary electron transfer agent accepts one or more electrons from the electron donor agent and delivers the electron(s) to another molecule or ion (e.g., ferric ion).

The primary electron transfer agent of the inventive composition is a source of rhenium ions, a compound or complex which generates or releases rhenium ions in the presence of ferric ions in the acid solution. The primary electron transfer agent is preferably a compound which is soluble in the acid solution and compatible with the composition in general (e.g., it does not produce problematic precipitates with reactive species in the solution). Generally, any rhenium compound capable of generating or releasing rhenium ions (e.g., $Re^n$ wherein n=+7, +6,+4,+2, or −1) in the solution will work. One or more sources of rhenium ions can be used.

Examples of rhenium compounds that can be used as a source of rhenium ions in accordance with the invention include perrhenic acid, rhenium dioxide ($ReO_2$), rhenium heptoxide ($Re_2O_7$), rhenium tetrachloride ($ReCl_4$), rhenium pentachloride ($ReCl_5$), rhenium hexachloride ($ReCl_6$), rhenium hexafluoride ($ReF_6$), rhenium oxybromide ($ReO_3Br$), rhenium oxychloride ($ReOCl_4$), rhenium oxyfluoride ($ReOF_4$), rhenium peroxide ($Re_2O_8$), rhenium tetrafluoride ($ReF_4$), rhenium trioxychloride ($ReO_3Cl$), rhenium disulfide ($ReS_2$), rhenium heptasulfide ($Re_2S_7$), potassium hexacyanatorhenate ($K_5[Re(CN)_6]$) and all octahalorhenates ($[Re(X)_8]^{2-}$) and octahalodirhenates ($[Re_2(X)_8]^{2-}$), where X=F, Cl, Br, I. The stabilities of the above compounds vary to some extent, but all are capable of generating rhenium ions in solution. Of the above, perrhenic acid and the rhenium salts are preferred. Perrhenic acid is most preferred due to its availability, ability to be easily handled, relatively high stability and relatively low cost.

The active species of the primary electron transfer agent is rhenium (VI). As long as the oxidation state is 6 or below, the rhenium compound will reduce ferric ion to ferrous ion. This will occur until the rhenium compound attains an oxidation state of 7. At an oxidation state of 7, the secondary electron transfer agent regenerates the rhenium (VI) species.

An important advantage of the invention is that the rhenium compounds useful as the primary electron transfer agent are effective in very low concentrations. As a result, the compounds are cost effective, easy to use and potentially more environmentally friendly than the "catalysts" used heretofore.

The secondary electron transfer agent is source of iodide ion or iodine, that is a compound or complex that releases or produces iodide ion or iodine in the presence of ferric ion in the acid solution. One or more sources of iodide ion or iodine can be used. The iodide ion/iodine source is preferably a compound that is soluble in the acid solution and compatible with the composition in general (e.g., it does not produce precipitates with reactive species in solution). Preferably, the iodide ion/iodine source is selected from the group consisting of potassium iodide, sodium iodide and iodine. These compounds are readily available in the marketplace.

The amounts of the primary and secondary electron transfer agents that should be used depend on the strength of the acid used, the specific electron donor agent used and the rate of reduction of ferric ion desired. The primary electron transfer agent is preferably present in the composition in an amount in the range of from about 0.1 to about 5 pounds (most preferably about 1 pound) per 1000 gallons of the mineral acid solution. The secondary electron transfer agent is preferably present in an amount in the range of from about 10 to about 80 pounds, more preferably from about 15 to about 30 pounds (most preferably about 20 pounds), per 1000 gallons of the mineral acid solution. For example, when the aqueous mineral acid solution is a 28% by weight hydrochloric acid solution and the electron donor agent is thioglycolic acid, at least about 0.1 pounds of the primary electron transfer agent and about 20 pounds of the secondary electron transfer agent per 1000 gallons of acid solution are required to reduce approximately 2500 ppm ferric ion in less than 5 minutes. As shown by the examples below, greater amounts of the primary and secondary electron transfer agents are required to achieve a rapid rate of reduction when the electron donor agent is hypophosphorous acid.

The overall amount of the electron transfer agent used (the combination of the primary electron transfer agent and the secondary electron transfer agent) is directly related to the rate of reduction of Fe(III) to Fe(II) achieved (i.e., the more electron transfer agent the faster the reduction).

For example, with perrhenic acid at a concentration of 1.0 lb./Mgal. and potassium iodide at a concentration of 20 lbs./Mgal. in 28% HCl, the reduction of 1250 ppm Fe(III) to Fe(II) occurs virtually instantaneously. There are no 'threshold' amounts for the electron transfer agents. For example, if one cuts the concentration by 50% much more time is needed to complete the reduction of ferric ion—the reduction process remains quantitative. It is important to bear in mind that a rough 'Kinetic Rule of Thumb' predicts that for every 10° C. increase in temperature there will be a doubling of the rate. The above concentrations were arrived at from room temperature experiments. Thus, at 250° F., a relatively low amount of electron transfer agent should be required.

As understood by those skilled in the art, laboratory screening procedures can be performed to determine the acid strength, amount of electron donor agent, amount of primary electron transfer agent, and amount of secondary electron transfer agent required to achieve the desired reduction of ferric ion to ferrous ion.

It is believed that the electron transfer system embodied in the inventive composition and method works in accordance with the following mechanistic scheme:

EDA=electron donor agent (e.g., thioglycolic acid, hypophosphorous acid)

EDA*=oxidized electron donor agent radical $$Re^{n+2} + I^- \rightarrow Re^{n+1} + \frac{1}{2}I_2 \quad (1)$$

$$Re^{n+1} + Fe^{3+} \rightarrow Re^{n+2} + Fe^{2+} \quad (2)$$

$$\frac{1}{2}I_2 + EDA \rightarrow EDA^* + I^- + H^+ \quad (3)$$

$$\overline{Fe^{3+} + EDA \rightarrow EDA^* + H^+ + Fe^{2+}} \quad (4)$$

Equation (1) shows the oxidation of the secondary electron transfer agent by the primary electron transfer agent producing iodine and a reduced form of the primary electron transfer agent. This reaction is fairly fast in the systems studied. Once 20° Be hydrochloric acid is added to the water containing the reduction system components, the fluid begins turning brown.

Equation (2) shows reduction of ferric ion by the reduced primary electron transfer agent. In this case, the rhenium (VII) ion is regenerated (e.g., $ReO_4^-$). This reaction will be fast.

Equation (3) shows regeneration of iodide ion by the electron donor agent. This step is key to the kinetics of the entire reduction sequence.

These systems appear to be very sensitive to the concentration of iodine. If the concentration of this species builds up, the process in Equation (1) will favor reactants and thus generation of the reduced primary electron transfer agent species will slow down considerably.

Equation (4) shows the overall transformation. The electron transfer agents cancel out of the process thus indicating a catalytic reaction. When the electron donor agent is thioglycolic acid, the electron donor agent radical (EDA) will dimerize to dithioglycolic acid ($HO_2CCH_2SSCH_2CO_2H$).

If hypophosphorous acid is used as the electron donor agent and the primary electron transfer agent is added to the finished acid (as opposed to being added to the acid during the initial mixing phase), the iodine color persists. This shows a relatively sluggish reduction of iodine by hypophosphorous acid and hence, the overall process is relatively slow. On the other hand, if thioglycolic acid is added to the finished acid in a similar fashion, the fluid is instantly decolorized showing fast kinetics for Equation (3) and therefore fast kinetics for the entire process. The instantaneous removal of iodine from the system will insure that the maximum kinetic rate is operating for the reduction of the electronic transfer agent.

The consequences of the correctness of this scheme may be directly transferred to simplified screening of potential electron source molecules. All one has to do is find substances that can effect the reduction of iodine in 28% hydrochloric acid at a significant rate. This is easily accomplished visually. The solution must change from brown to a colorless fluid. The most obvious caution would be to make sure iodine does not simply add to multiple bonds in the screening of unsaturated candidates.

The above thinking has been applied to determination of the activity range of the rhenium catalyst. A solution of rhenium oxide ($Re_2O_7$) in water (forming perrhenic acid) containing potassium iodide results in a colorless solution (slight cloud). Slow addition of 20° Be hydrochloric acid causes no change until the overall acid strength reaches about 25% hydrochloric acid. At this point, the fluid color begins to turn yellow-brown from iodine production. This experiment was carried out under a blanket of argon gas to insure the oxidation of iodine was by rhenium ion and not oxygen. Another prediction, consistent with the mechanism and other findings, would be that the rhenium system reduction kinetics would increase with increasing acid strength. A 30% hydrochloric acid solution should reduce faster than 28% hydrochloric acid solution. This will be a function of the dependence of iodine oxidation on acid strength only.

Thus, using small quantities of certain rhenium compounds in combination with potassium iodide and an electron donor agent (e.g., thioglycolic acid) causes a catalytic reduction of ferric ion to occur.

The inventive acidizing composition can also include various additives. For example, one or more surface active agents can be employed to improve dispersion of the components in the acid solution. Surface active agents are particularly useful when relatively long chain components are used in the acid solution. The surface active agents can be blended directly with the components by themselves or combined with the acid solution. Alternatively, the surface active agent or agents can be admixed with the acid solution before the components are added thereto. The surfactants should be used in amounts sufficient to thoroughly disperse or dissolve the components in the acid solution. Examples of surface active agents that can be used are ethoxylated nonylphenols, fatty amines, ethoxylated fatty amines, quaternary fatty amines and ethoxylated quaternary fatty amines.

Separation of the components from, or lack of sufficient dispersion of the components in, the acid solution may occur in some instances. Such separation or lack of dispersion may result in lower efficiency. Accordingly, use of surface active agents, as above described, may be required to help produce sufficient dispersion to avoid precipitation. It is believed that sufficient dispersion may also be obtained by constant agitation or mixing of the acid solution in the components. Satisfactory agitation is provided by turbulent flow within the tubular goods in the well. A combination of mechanical mixing and the use of surface active agents may be employed to obtain sufficient dispersion.

Other additives that can be included in the inventive composition include corrosion inhibitors, pH control additives, fluid loss additives, non-emulsifying agents, oxygen scavengers, hydrogen sulfide scavengers, and mutual solvents.

Oxygen scavengers can be used to reduce the amount of oxygen present in the acid solution to inhibit formation of ferric iron by oxidation of ferrous iron. Compounds such as erythorbic acid and hydroxylamine complex serve as both iron reducing agents and oxygen scavengers. Erythorbic acid also acts as an iron complexing agent.

A suitable mutual solvent for use in the present invention is ethylene glycol monobutyl ether ($C_6H_{14}O_2$). Ethylene glycol monobutyl ether helps solubulize hydrophobic components in the solution.

Reduction of the ferric ion present in the acidizing composition helps prevent the formation of sludge in crude oil. The use of one or more surfactants in the inventive composition can further decrease sludge formation. For example, a useful surfactant for further decreasing sludge formation is dodecylbenzenesulfonic acid. Additional anti-sludge agents can be used as well. The specific surfactants and anti-sludge agents that should be used to combat sludge are dependent upon the specific crude oil and formation conditions and characteristics and other factors known to those skilled in the art.

In another aspect, the present invention provides a method of treating a subterranean formation in the presence of ferric ions. In accordance with the inventive method, the inventive acidizing composition is formulated and introduced into the well. No special mixing procedure or order of mixing is required. The components can be injected and circulated in the well by any technique known in the art. They can be admixed and then injected or separately injected, for example, on the fly, such that they are admixed in the well.

The acidizing composition is preferably recovered from the well after it has become substantially spent or after the well has been sufficiently treated. The spent acid can be removed from the formation via the wellbore, can be forced through the formation to a recovery well, or can be forced over a wide area so that any precipitate that may form will have only a small detrimental effect, if any.

For example, the invention includes a method of treating a sour well in the presence of ferric ions. During the operation, the electron donor agent and associated electron transfer agent(s) reduce ferric ion to ferrous ion thereby preventing formation of elemental sulfur.

The inventive acidizing composition can be used in many additional ways as well. For example, the composition can be used as a spearhead in the leading 25 to 33 percent of the volume of acid used for stimulating and fracturing treatments. The composition can be used to clean up disposal and injection wells and flow lines that contain ferric corrosion products. It is very effective for cleaning tubing and casing in sour wells. It is also useful for acidizing sour wells with tubing obtained from sweet wells.

The following examples are provided in order to help provide a clear understanding of the compositions and method of the present invention. The examples are presented to illustrate certain specific embodiments of the invention, but they are not to be construed so as to be unduly restrictive of the scope or spirit thereof.

EXAMPLE I

The inventive composition was tested for its ability to reduce ferric ion to ferrous ion in a strong mineral acid solution.

In carrying out the tests, a concentrated ferric ion solution was first prepared by dissolving ferric chloride ($FeCl_3 \cdot 6H_2O$) in an aqueous acid solution containing 20% by weight hydrochloric acid, based on the total weight of the acid solution (a "20% HCl solution"). Approximately 60.5 grams of the ferric chloride was added to an amount of the 20% HCl solution sufficient to yield 100 mL total volume. The resulting solution was 15% HCl equivalent and therefor did not significantly reduce the concentration of the test acid. For example, one mL of the ferric chloride concentrate produced approximately 1,250 ppm ferric ion contamination when added to 100 mL of the test fluid.

In a first test, approximately one mL of the concentrated ferric chloride solution was added to the inventive composition. The inventive composition tested consisted of approximately 100 mL of an aqueous acid solution including 28% by weight hydrochloric acid, based on the total weight of the acid solution (a "28% HCl solution"), 1% by volume thioglycolic acid, based on the total volume of the acid solution, 1.0 lb./Mgal. perrhenic acid ($HReO_4$), and 20 lbs./Mgal. potassium iodide. The composition was stirred using a magnetic stirrer throughout the test. The test was carried out at room temperature. Addition of the ferric chloride imparted approximately 1250 ppm of ferric ion to the composition.

The reduction of ferric ion to innocuous ferrous ion and the rate thereof was monitored by visually observing the test fluid for a change in color. For example, prior to the addition of the ferric chloride solution, the test composition was a red-brown color. Upon addition of the ferric chloride solution, the test composition technically turns to a light tan color. Upon substantially complete reduction of the ferric ion to ferrous ion, the test composition changes to a red-brown color.

The first test composition did not visually change color upon addition of the ferric chloride (the reaction was so fast the initial color change to a light tan color could not be observed). The reduction reaction was so rapid that complete reduction occurred in the vortex caused by stirring the solution.

A second test was then carried out using the same procedure but a different composition. In this test, the inventive composition consisted of approximately 100 mL of a 28% HCl solution, 1% by volume hypophosphorous acid, based on the total volume of the acid solution, 1.0 lb./Mgal. perrhenic acid and 20 lbs./Mgal. potassium iodide. Although all of the ferric ion was reduced to ferrous ion, the reduction was not as rapid as it was in the first test. The second test composition immediately changed from a red-brown color to a light tan color upon addition of the ferric chloride. It took approximately 15 minutes for the color of the composition to change to a red-brown color; i.e., for the reduction reaction to go to completion.

Thus, when the electron donor agent is thioglycolic acid, the rhenium electron transfer system of the invention results in a very rapid reduction of ferric ion. The reaction kinetics when hypophosphorous acid is the electron donor agent are much slower. Higher loadings of the primary and secondary electron transfer agents are required.

EXAMPLE II

A series of additional experiments were carried out to test the rate of reduction of ferric ion ($Fe^{3+}$) by the inventive acidizing composition. Various test fluids were tested, each test fluid consisting of approximately 100 mL of a 28% HCl solution, 1% by volume, based on the total volume of the acid solution, of an electron donor agent (either thioglycolic acid or hypophosphorous acid), perrhenic acid and potassium iodide. The amounts of perrhenic acid and potassium iodide were varied from test to test. The procedure used to carry out the tests was identical to the test procedure described in EXAMPLE I. The results are set forth in Table 1 below:

TABLE 1

Reduction of Ferric Ion by Perrhenic Acid/Potassium Iodide in 28% HCl at Room Temperature

| Test # | EDA[1] | Prim. ETA Conc.[2] | Supp. ETA Conc.[3] | Reduction Time[4] |
| --- | --- | --- | --- | --- |
| 1 | TGA | 1.0 lb./Mgal. | None | No reduction |
| 2 | TGA | 1.0 lb./Mgal. | 1.4 lbs./Mgal. | ≈4 minutes |
| 3 | TGA | 1.0 lb./Mgal. | 20 lbs./Mgal. | Instantaneous |
| 4 | TGA | 0.1 lb./Mgal. | 40 lbs./Mgal. | ≈6 minutes |
| 5 | HPA | 1.0 lb./Mgal. | 20 lbs./Mgal. | ≈15 minutes |

[1] 1% by volume, based on the total volume of the acid solution, either thioglycolic acid ("TGA") or hypophosphorous acid ("HPA").
[2] The amount of perrhenic acid added to the acid solution.
[3] The amount of potassium iodide added to the acid solution.
[4] The amount of time required for the color of the composition to return to the color of elemental iodide; i.e., the amount of time required for approximately all of the ferric ion to be reduced to ferrous ion.

Thus, the rhenium electron transfer agent has a very high activity in 28% hydrochloric acid solutions. In fact, the activity appears to be superior to that exhibited by copper. For example, when combined with 20 lbs./Mgal. of potassium iodide, 80 ppm perrhenic acid (8.5 ppm is equivalent to approximately 0.1 lb./Mgal) causes an instantaneous reduction of 1250 ppm ferric ion in 28% HCl. By comparison, 1000 ppm cuprous chloride combined with 20 lbs./Mgal. potassium iodide takes approximately 5 minutes to reduce 1250 ppm ferric ion in 28% HCl.

EXAMPLE III

Emulsion break and sludging tests were carried out on four different types of crude oils. The inventive composition was compared to a prior art acidizing composition known to be effective in controlling sludge formation in mineral acid systems.

The four crude oils used in the tests were South Pass crude from Houma, Louisiana ("Crude A"); Crutchley 3–10 from Brighton, Colorado ("Crude B"), BPX Troika from the Gulf of Mexico ("Crude C") and Pemex Tecominoacan # 446 from Tabasco, Mexico ("Crude D").

Each test was carried out using a hydrochloric acid solution including approximately 28% by weight hydrochloric acid and an amount of an anti-sludging additive, dodecylbenzene sulfonic acid, sufficient to prevent acid-induced sludging (e.g., sludge formation even in the absence of ferric ion). The inventive test fluids additionally included 1% by volume, based on the volume of the acid solution, thioglycolic acid, 1.0 pound perrhenic acid per 1000 gallons of the acid solution and 20 pounds potassium iodide per 1000 gallons of the acid solution. The prior art test fluids additionally included 1% by volume, based on the volume of the acid solution, thioglycolic acid and 7.0 pounds of cuprous chloride per 1000 gallons of the acid solution.

Test fluids were contaminated with 2500 ppm of ferric ion by adding a corresponding amount of iron chloride ($FeCl_3 \cdot 6H_2O$) thereto.

The tests were carried out at room temperature, approximately 70° F. Each test was carried out by contacting approximately 25 mL of the test fluid with approximately 25 mL of the subject crude oil in a beaker. The resulting mixtures were visually observed after approximately 30 minutes. The results are shown by Table II below.

The preceding examples can be repeated with similar success by substituting the generically or specifically described steps and operating conditions of this invention for those used in the examples.

Although certain preferred embodiments of the invention have been described for illustrative purposes, it will be appreciated that various modifications and innovations of the inventive method and composition may be effected without departure from the basic principles which underlie the invention. Changes of this type are therefore deemed to lie within the spirit and scope of the invention except as may be necessarily limited by the inventive claims and reasonable equivalents thereof.

What is claimed is:

1. A method of treating a subterranean formation, comprising:
   contacting the formation with an acidizing composition, said acidizing composition including:
   a strong mineral acid solution selected from the group of:
   (a) an aqueous acid solution including at least about 25% by weight, based on the total weight of the solution, hydrochloric acid; and
   (b) an aqueous acid solution including a mixture of hydrochloric acid and one or more other acids, said hydrochloric acid and other acids being present in the solution in amounts sufficient for the solution to have an acid strength equal to or greater than the acid strength of an aqueous acid solution including about 25% by weight, based on the total weight of the solution, hydrochloric acid;
   an electron donor agent; and
   a primary electron transfer agent, said primary electron transfer agent being a source of rhenium ions; and
   a secondary electron transfer agent, said secondary electron transfer agent being selected from the group consisting of a source of iodide ion and an source of iodine,

TABLE II

Emulsion Break and Sludging Tests

| Crude | A/S Amt[1] | S-1 EB[2] | S-1 Sludge[3] | S-2 EB[2] | S-2 Sludge[3] | S-3 EB[2] | S-3 Sludge[3] | S-4 EB[2] | S4 Sludge[3] |
|---|---|---|---|---|---|---|---|---|---|
| A | 1.0% | 100% - 2 min. | None | 100% - >30 min. | Heavy | 100% - 6 min. | None | 100% - 1 min. | None |
| B | 1.5% | 100% - 1 min. | None | 100% - >30 min. | Slight | 100% - 8 min. | None | 100% - 1 min | None |
| C | 0.75% | 100% - 3 min. | None | 100% - >30 min. | Moderate | 100% - 7 min. | None | 100% - 1 min | None |
| D | 2.5% | 100% - 2 min. | None | 100% - 20 min. | Heavy | 100% - 10 min. | None | 100% - 1 min. | None |

S-1 - Acid and anti-sludging agent
S-2 - Acid, anti-sludging agent and 2500 ppm ferric ion
S-3 - Prior art test fluid and 2500 ppm ferric ion
S-4 - Inventive test fluid and 2500 ppm ferric ion
[1] the amount of the anti-sludging additive, dodecylbenzene sulfonic acid - % by volume based on the volume of the acid solution
[2] the degree to which the emulsion formed by admixture of the test fluid and crude oil was broken, as determined by visual observation, and the amount of time required for the emulsion to break
[3] the amount of sludge created by admixture of the test fluid and crude oil - determined by visual observation The data in Table II clearly shows that the inventive acidizing composition is effective in reducing ferric iron, and preventing emulsion and sludge formation in mineral acid systems, and in connection with a variety of crude oils. The inventive composition acted faster than the prior art system tested.

whereby said electron donor agent and said primary and secondary electron transfer agents function together to reduce ferric ion present in said aqueous mineral acid solution to ferrous ion.

2. The method of claim 1 wherein said strong mineral acid solution is an aqueous acid solution including at least about 25% by weight, based on the total weight of the solution, hydrochloric acid.

3. The method of claim 2 wherein said aqueous acid solution includes hydrochloric acid in an amount in the range of from about 25% to about 35% by weight, based on the total weight of the aqueous mineral acid solution.

4. The method of claim 3 wherein said aqueous acid solution includes hydrochloric acid in an amount of approximately 28% by weight based on the total weight of the aqueous mineral acid solution.

5. The method of claim 1 wherein said electron donor agent is selected from the group consisting of a thiol compound having a carbon chain that includes an oxygen or oxygen containing functional group in the beta position, hypophosphorous acid, and a hypophosphorous acid precursor.

6. The method of claim 5 wherein said electron donor agent is a thiol compound selected from the group consisting of compounds of the formula $HSCH_2C(O)R_1$ and compounds of the formula $HSCH_2C(OH)R_3R_4$ wherein:

$R_1$ is either OH, OM or $R_2$;

M is a corresponding cation of the carboxylate anion of the thiol;

$R_2$ is an organic radical having from 1 to 6 carbon atoms;

$R_3$ is either H or an organic radical having from 1 to 6 carbon atoms; and $R_4$ is either H or an organic radical having from 1 to 6 carbon atoms.

7. The method of claim 6 wherein said electron donor agent is selected from the group consisting of colic acid, thioglycolic acid precursors, β-hydroxymercaptans, thiomalic acid and thiolactic acid.

8. The method of claim 7 wherein said electron donor agent is thioglycolic acid.

9. The method of claim 5 wherein said electron donor agent is selected from the group consisting of hypophosphorous acid and hypophosphorous acid precursors.

10. The method of claim 9 wherein said electron donor agent is selected from the group consisting of hypophosphorous acid, sodium phosphinate, calcium phosphinate, ammonium phosphinate and potassium phosphinate.

11. The method of claim 1 wherein said electron donor agent is present in said composition in an amount in the range of from about 0.01% to about 10% by volume based on the volume of said mineral acid solution.

12. The method of claim 1 wherein said primary electron transfer agent is selected from the group consisting of perrhenic acid and rhenium salts.

13. The method of claim 1 wherein said primary electron transfer agent is perrhenic acid.

14. The method of claim 1 wherein said primary electron transfer agent is present in said composition in an amount in the range of from about 0.1 pounds to about 5 pounds per 1000 gallons of said mineral acid solution.

15. The method of claim 1 wherein said secondary electron transfer agent is selected from the group consisting of potassium iodide, sodium iodide and iodine.

16. The method of claim 15 wherein said secondary electron transfer agent is present in said composition in an amount in the range of from about 15 to about 30 pounds per 1000 gallons of said mineral acid solution.

* * * * *

UNITED STATES PATENT AND TRADEMARK OFFICE
CERTIFICATE OF CORRECTION

PATENT NO. : 6,415,865 B1
DATED : July 9, 2002
INVENTOR(S) : Michael M. Brezinski It is certified that error appears in the above-identified patent and that said Letters Patent is hereby corrected as shown below:

<u>Title page,</u>
Insert -- [73] Assignee: Halliburton Energy Services, Inc.
Houston, TX (US) --.

Signed and Sealed this

Twelfth Day of November, 2002

Attest:

JAMES E. ROGAN
*Attesting Officer*     *Director of the United States Patent and Trademark Office*